United States Patent
Borrello et al.

(10) Patent No.: US 7,062,159 B1
(45) Date of Patent: Jun. 13, 2006

(54) DEVICE FOR CORRECTING A DIGITAL ESTIMATE OF AN ELECTRIC SIGNAL

(75) Inventors: Antonio Borrello, Milan (IT); Stefano Saggini, San Donato Milanese (IT); Aldo Novelli, Parabiago-Loc. S. Lorenzo (IT); Ignazio Bellomo, Rozzano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/005,707

(22) Filed: Dec. 7, 2004

(51) Int. Cl.
*H02P 7/06* (2006.01)

(52) U.S. Cl. ............... 388/801; 388/800; 388/803; 388/806; 388/809; 388/821; 388/823; 318/600; 318/601; 318/604; 341/51; 341/4; 341/138

(58) Field of Classification Search ......... 318/600, 318/601, 604; 388/801, 800, 803, 806, 809, 388/821, 823; 341/4, 138, 51
See application file for complete search history.

(56) References Cited

U.S. PATENT DOCUMENTS

| | | | | |
|---|---|---|---|---|
| 4,063,146 A | * | 12/1977 | Oliver | 323/241 |
| 4,260,937 A | * | 4/1981 | Cavil et al. | 388/801 |
| 4,441,061 A | * | 4/1984 | Yoshida et al. | 318/329 |
| 5,361,025 A | * | 11/1994 | De Filippis et al. | 318/599 |
| 6,703,848 B1 | * | 3/2004 | Cho | 324/678 |
| 6,816,104 B1 | * | 11/2004 | Lin | 341/172 |

* cited by examiner

*Primary Examiner*—Rita Leykin
(74) *Attorney, Agent, or Firm*—Lisa K. Jorgenson; Robert Iannucci; Seed IP Law Group PLLC

(57) ABSTRACT

A device for correcting a digital estimate of an electric signal is described. The device includes a comparator that generates a current proportional to the difference between an analog estimate signal, which derives from the digital estimate, and the electric signal. The device also includes a capacitor positioned to be charged by the current, a transistor that discharges the capacitor, and a comparator that compares the voltage at the terminal of the capacitor with a reference voltage. The device also includes a controller that drives the transistor in response to the output signal of the comparator and a logic device that generates a correction digital signal to be added to or subtracted from the digital estimate of the electric signal in correspondence of an ascending or descending waveform of the electric signal.

11 Claims, 4 Drawing Sheets

DEVICE FOR CORRECTING A DIGITAL ESTIMATE OF AN ELECTRIC SIGNAL

BACKGROUND OF THE INVENTION

1. Field of the Invention

The present invention refers to a device for correcting a digital estimate of an electric signal.

2. Description of the Related Art

Devices for effectuating a digital estimate of an electric signal are known in the state of the art. Particularly said devices are used in control systems of motors wherein a high precision is required as, for example, in control systems for stepper motors.

A typical control system for a bipolar stepper motor is shown in FIG. 1. A control device 1 controls a power stage of the stepper motor which is constituted by a full-bridge 2 coupled with the supply voltage Vcc and ground. By means of a sense resistance Rs it is possible to obtain a voltage signal Vs proportional to the current flowing through a phase winding of the motor. The voltage signal Vs is compared by means of a comparator 3 with an output signal of a DAC 4. A controller 5 supplies the input signals of the DAC that sets the current level so as to assure a precise peak value of the phase current.

It is possible that the voltage level of the output signal of the DAC 4 is away from the voltage Vs; this can determine errors in the estimate of the signal Vs and in control operation of the motor.

BRIEF SUMMARY OF THE INVENTION

One embodiment of the present invention provides a device for correcting a digital estimate of an electric signal which reduces the error of the digital estimate of the electric signal.

One embodiment of the present invention provides a device for correcting a digital estimate of an electric signal. The device includes first means for generating a current proportional to the difference between an estimate analog signal, which derives from the digital estimate, and the electric signal, a capacitor positioned to be charged by the current and second means for discharging the capacitor, a comparator that compares the voltage at the terminals of said capacitor with a reference voltage, control means for driving the second means in response to the output signal of the comparator and third means for generating a correction digital signal to be added to or subtracted from the digital estimate of the electric signal in correspondence of an ascending or descending waveform of the electric signal.

BRIEF DESCRIPTION OF THE SEVERAL VIEWS OF THE DRAWING(S)

The features and the advantages of the present invention will be made evident by the following detailed description of one particular embodiment, illustrated as not limiting example in the annexed drawings, wherein.

DETAILED DESCRIPTION OF THE INVENTION

Figure 2:
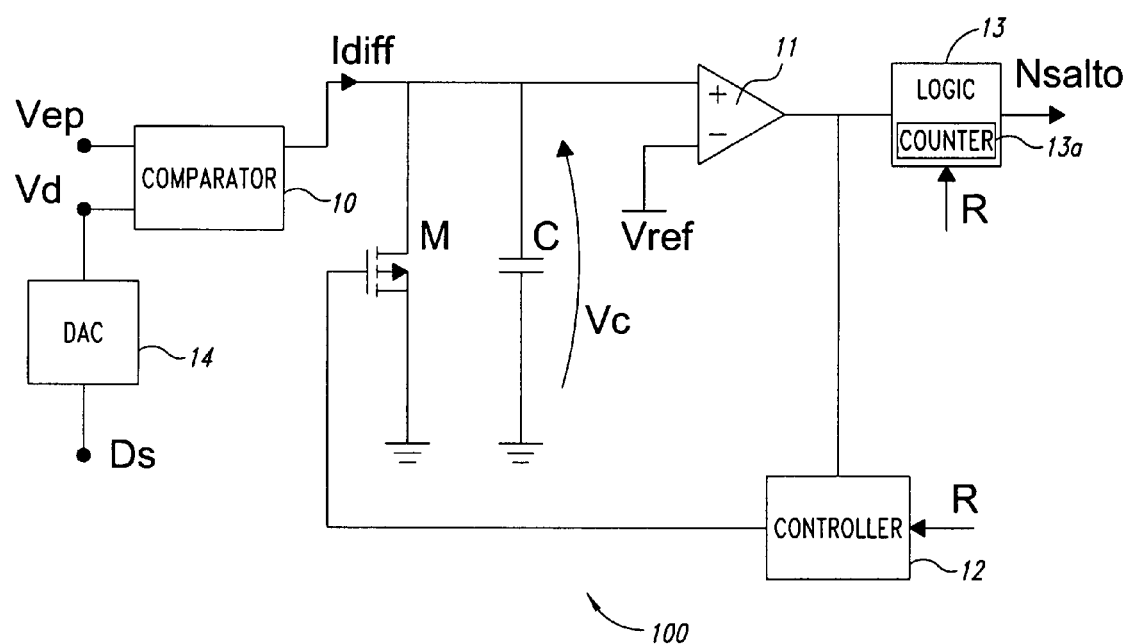
FIG. 2 is a schematic view of a device for correcting a digital estimate of an electric signal according to the present invention.

With reference to FIG. 2 a device 100 for correcting a digital estimate Ds of an electric signal Vep according to one embodiment of the present invention is shown. The device comprises a comparator 10 that generates a current Idiff proportional to the difference between an analog estimate signal Vd, which derives from the digital estimate Ds, and the electric signal Vep; a capacitor C positioned to be charged by the current Idiff; and a device M for discharging said capacitor. The device M preferably is constituted by a MOS transistor connected to the terminals of the capacitor C. The device 100 comprises a comparator 11 that compares the voltage Vc at the terminals of said capacitor C with a reference voltage Vref, a controller 12 that drives said transistor M in response to the output signal of the comparator 11, and logic circuitry 13 structured to generate a digital output signal Nsalto to be added to or subtracted from the digital estimate Ds of the electric signal Vep. A digital to analog converter (DAC) 14 generates the signal Vd from the input digital estimate Ds.

The current signal Idiff can be obtained by using, as the comparator 10, a transistor with a transconductance gm; the current Idiff is given by:

$$Idiff = gm \times (Vd - Vep) = gm \times \Delta V.$$

The current Idiff charges the capacitor C by generating the ramp signal Vc. From the voltage-current differential characteristic of the capacitor it is obtained that:

$$Idiff = gm \times \Delta V = C \frac{dV}{dt},$$

from which it is possible to obtain:

$$\Delta V = \frac{C}{gm} \frac{dV}{dt}.$$

The signal $\Delta V$ indicates the distance between the signal Vd and the signal Vep. The signal $\Delta V$ can be converted into a digital word Nsalto with a certain bit number. The word Nsalto is calculated by dividing the voltage $\Delta V$ by the resolution L of the digital estimate Ds; when the bit number of the digital estimate has been fixed, it is possible to know the resolution L. It has:

$$Nsalto = \frac{\Delta V}{L} = \frac{1}{L}\left(\frac{dV}{gm} \frac{C}{dt}\right).$$

The values of the capacitor C and the transconductance gm can be fixed in arbitrary way.

The logic circuitry 13 comprises a counter 13A that starts counting when the ramp signal Vc increases and the counting is stopped when the output signal of the comparator 11 changes; in the last moment it has dV=Vref and dt=Tc wherein Tc is the time period counted by the counter. Therefore the correcting digital signal Nsalto is proportional to the inverse of the time period or count value Tc multiplied by the resolution L.

The correcting digital signal Nsalto is added to or subtracted from the digital estimate Ds in correspondence of an ascending or descending waveform of the electric signal Vep. Structures for detecting whether the electric signal Vep is ascending or descending and for producing the digital estimate Ds are discussed in a U.S. Patent Application No. 11/006,432 being filed on Dec. 7, 2004 entitled Device To Effectuate A Digital Estimate Of A Periodic Electric Signal, Related Method And Control System For An Electric Motor Which Comprises Said Device, which is incorporated herein by reference.

Hereinafter the operation method of the device 100 will be explained.

Initially there is a reset step in which a reset signal R is sent to the logic circuitry 13 for resetting the counter 13A and to the controller 12 for turning on the transistor M.

After the reset step there is a charge step wherein the capacitor C is charged by the current Idiff; the ramp signal Vc at the terminals of the capacitor C increases, the controller 12 turns off the transistor M and the counter of the logic circuitry 13 starts the counting.

After the charge step, when the value of the voltage signal Vc reaches the value of the reference voltage Vref, the output signal of the comparator 11 changes and consequently the counting of the counter 13A of the logic circuitry 13 is stopped and the control means turn on the transistor M for discharging the capacitor C. The time period Tc counted by the counter of the logic circuitry 13 allows obtaining the word Nsalto to be added to or subtracted from the digital signal Ds for correcting the digital estimate of the electric signal Vep.

If a transconductance gm=0.1 mS, a capacitor C=20 pF, a digital word Ds at height bits with L=7.14 mV and a reference voltage Vref=1 V are used it has:

$$Nsalto = \frac{1}{7.14\ mV}\left(\frac{1\ V}{0.1\ mS}\frac{20\ pF}{dt}\right) = \frac{28\ \mu s}{dt}.$$

For increasing the precision it is possible to update the counter 13A of the logic circuitry 13 for each clock semi-period; if the clock frequency is 5 Mhz the clock period is T=200 ns. For increasing the precision the counter is updated for each clock semi-period and the element dt is expressed in unit of T/2=100 ns; in this way the signal Nsalto is:

$$Nsalto = \frac{28\ \mu s}{Nc \times T/2} = \frac{280}{Nc}$$

wherein Nc is the number of pulses which is counted by the counter 13A.

Figure 3:
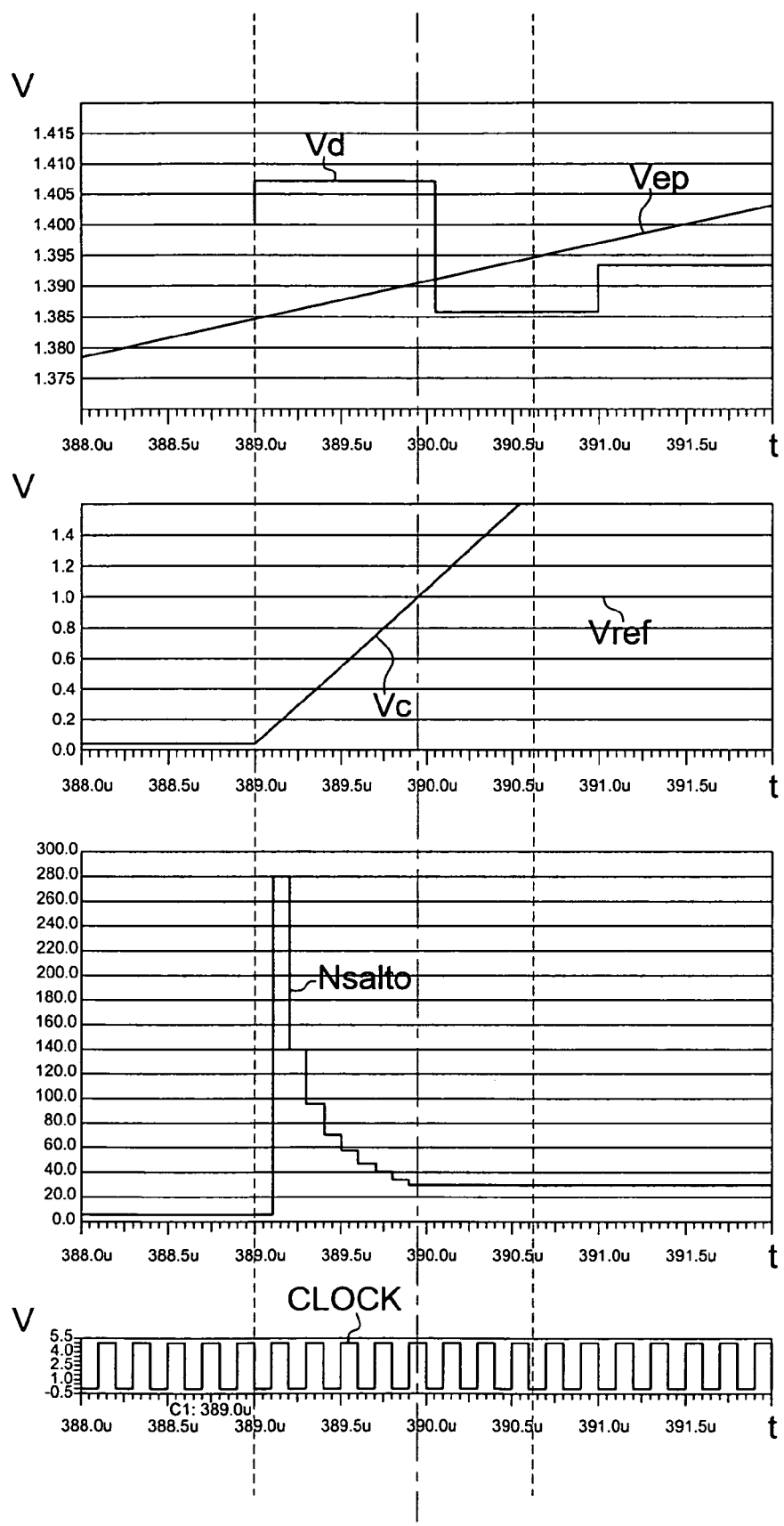
FIG. 3 shows time diagrams of electric signals of the devices in FIG. 2.

As shown in FIG. 3 the voltage signal Vc, after the reset step, increases as a ramp signal until it reaches the voltage Vref; in this case the counter 13A is updated for nine half periods of the signal CLOCK and therefore the signal Nsalto is Nsalto=280/9=31.1. Since the signal Nsalto must be an integer number, its value is fixed at 31. The value of the signal Ds is diminished by a value Nsalto=31. Normally a value 1 is added to the value of the signal Ds for considering the delay of the counting and the delay due to the fixing of the signal Ds with respect to the switching of the comparator 11.

Figure 1:
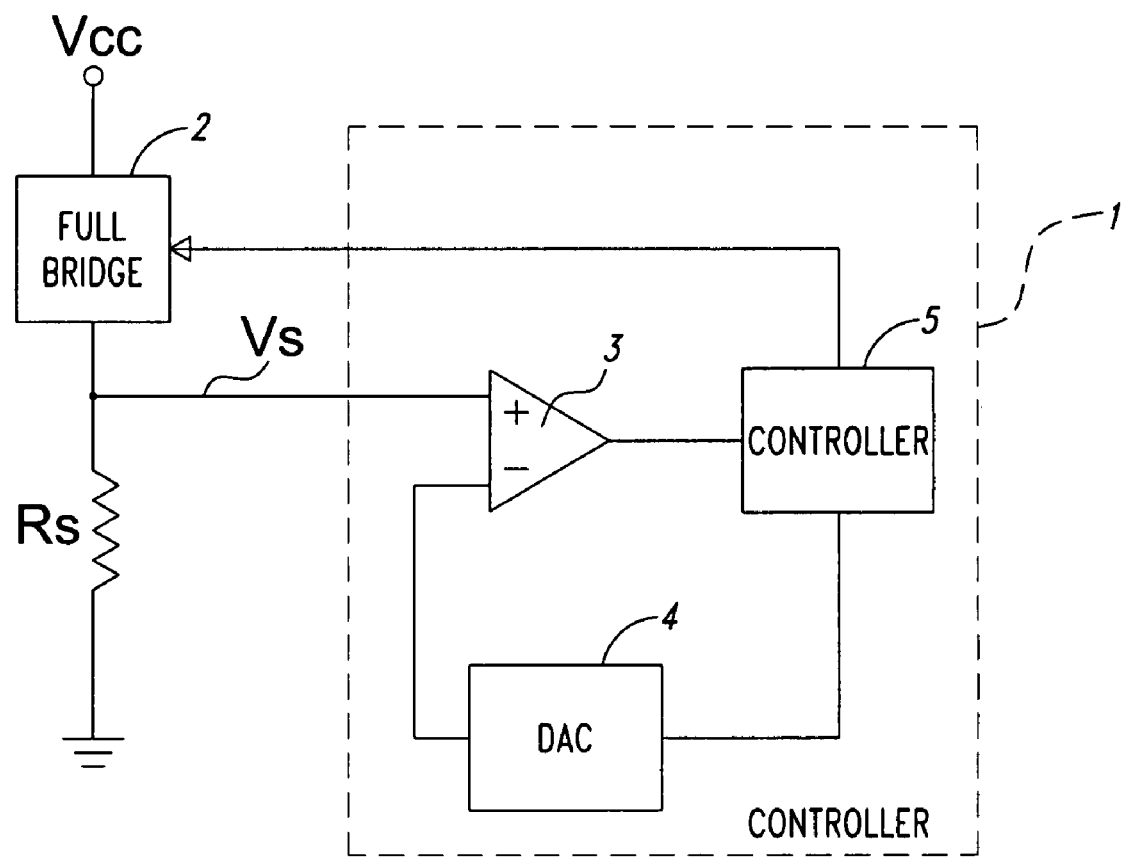
FIG. 1 is a schematic view of a control system for a bipolar stepper motor in accordance with prior art.
Figure 4:
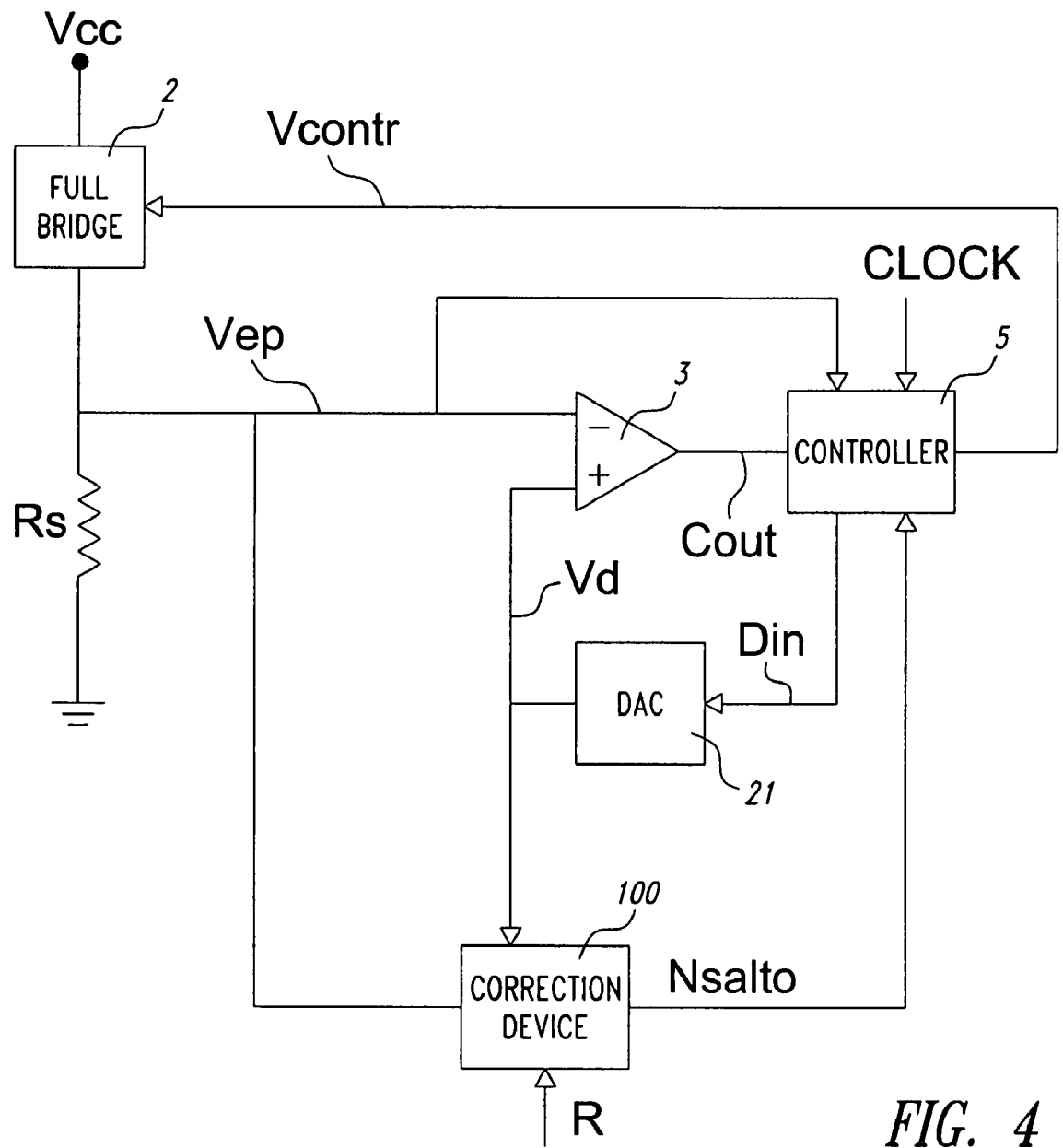
FIG. 4 is a schematic view of an application of the device in FIG. 2.

In FIG. 4 a schematic view of a control system for a stepper motor which comprises the device 100 in FIG. 2 in accordance with the present invention is shown; the elements equal to the elements of the circuits in FIGS. 1 and 2 are indicated with the same references. The control system comprises the device 100 in FIG. 2 which is applied to the voltage Vep deriving from the terminals of a sense resistance Rs of a power stage 2 of a stepper motor and the voltage Dout that is the output voltage of a DAC 21; the power stage 2 is constituted by a full-bridge and it is supplied by the supply voltage Vcc. The voltage Vep is compared with the voltage Dout by a comparator 3; the output signal Cout of the comparator 11 is sent to control circuitry 20 structured to provide a digital signal Din in input to the DAC 21 and structured to control the full-bridge 2 by means of a control signal Vcontr.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A device for correcting a digital estimate of an electric signal, said device comprising:
    first means for generating a current proportional to a difference between an analog estimate signal, which derives from the digital estimate, and said electric signal;
    a capacitor positioned to be charged by said current;
    second means for discharging said capacitor;
    a comparator for comparing a voltage at a terminal of said capacitor with a reference voltage and producing an output signal;
    control means for driving said second means in response to the output signal of the comparator; and
    third means for generating a correction digital signal to be added to or subtracted from the digital estimate of said electric signal in correspondence of an ascending or descending waveform of said electric signal.

2. A device according to claim 1, wherein said third means comprise a counter that produces a count value by starting counting when the current produced by the first means increases and stopping counting when the voltage at the terminal of said capacitor reaches the reference voltage, said correction digital signal being proportional to the inverse of a quantity equal to the count value multiplied by a resolution of the estimate digital signal.

3. A device for effectuating a digital estimate of an electric signal, said device comprising:
    a DAC having an output signal;
    comparing means for comparing said output signal of the DAC with said electric signal and producing an output signal;
    logic circuitry having in input the output signal of the comparing means and a pulse clock signal, said logic circuitry providing a digital signal in input to the DAC;
    a correction device for correcting the digital signal, said correction device including:
        first means for generating a current proportional to a difference between the output signal of the DAC and the electric signal;
        a capacitor positioned to be charged by said current;
        second means for discharging said capacitor;

further comparing means for comparing a voltage at a terminal of said capacitor with a reference voltage and generating an output signal;

control means for driving said second means in response to the output signal of the further comparing means; and third means for generating a correction digital signal to be added to or subtracted from the digital signal in correspondence of an ascending or descending waveform of said electric signal.

4. A device according to claim 3 wherein said third means comprise a counter that produces a count value by starting counting when the current produced by the first means increases and stopping the counting when the voltage at the terminal of said capacitor reaches the reference voltage, said correction digital signal being proportional to the inverse of a quantity equal to the count value multiplied by a resolution of the digital signal.

5. A control system for a motor, comprising:

a power stage supplied by a supply voltage;

a sense resistance coupled with the power stage and positioned to provide a periodic electric signal;

a control circuit structured to control said power stage;

a DAC having an output signal;

comparing means for comparing said output signal of the DAC with said periodic electric signal and producing an output signal;

control circuitry having in input the output signal of the comparing means and a pulse clock signal, said control circuitry providing a digital signal in input to the DAC and a control signal in input to the power stage;

a correction device for correcting the first digital signal, said correction device including:

first means for generating a current proportional to a difference between the output signal of the DAC and the electric signal;

a capacitor positioned to be charged by said current;

second means for discharging said capacitor;

further comparing means for comparing a voltage at a terminal of said capacitor with a reference voltage and providing an output signal;

control means for driving said second means in response to the output signal of the further comparing means; and third means for generating a correction digital signal to be added to or subtracted from the first digital signal in correspondence of an ascending or descending waveform of said electric signal.

6. A control system according to claim 5 wherein said third means comprise a counter that produces a count value by starting counting when the current produced by the first means increases and stopping the counting when the voltage at the terminal of said capacitor reaches the reference voltage, said correction digital signal being proportional to the inverse of a quantity equal to the count value multiplied by a resolution of the digital signal.

7. A method for correcting a digital estimate of an electric signal, said method comprising:

generating a current proportional to a difference between an analog estimate signal, which derives from the digital estimate, and said electric signal;

charging a capacitor by said current;

comparing a voltage at a terminal of said capacitor with a reference voltage and producing an output signal;

discharging said capacitor in response to the output signal of the comparing step;

generating a correction digital signal to be added to or subtracted from the digital estimate of said electric signal in correspondence of an ascending or descending waveform of said electric signal.

8. A method according to claim 7, wherein said step of generating a correction digital signal comprises counting a time period comprised between starting the charging of the capacitor and an instant wherein the voltage at the terminal of said capacitor reaches the reference voltage, said correction digital signal being proportional to the inverse of a quantity equal to the count value multiplied by a resolution of the estimate digital signal.

9. A device for producing a digital estimate of an electric signal, said device comprising:

a DAC having an output signal;

a first comparator that compares the output signal of the DAC with the electric signal and produces an output signal;

a first logic device having in input the output signal of the comparator and a pulse clock signal, the logic device providing a digital signal in input to the DAC;

a correction device for correcting the digital signal, said correction device including:

a current generator that generates a current proportional to a difference between the output signal of the DAC and the electric signal;

a capacitor positioned to be charged by the current;

a second comparator that compares a voltage at a terminal of the capacitor with a reference voltage and generates an output signal; and a second logic device that generates a correction digital signal that is added to or subtracted from the digital signal based on whether the electric signal is ascending or descending.

10. The device of claim 9 wherein the second logic device includes a counter that produces a count value by starting counting when the current produced by the current generator increases and stopping the counting when the voltage at the terminal of said capacitor reaches the reference voltage, the correction digital signal being proportional to the inverse of a quantity equal to the count value multiplied by a resolution of the digital signal.

11. The device of claim 9, wherein the correction device includes:

a switch coupled to the capacitor and structured to discharge the capacitor; and a control circuit coupled between the second comparator and a control terminal of the switch and structured to drive the switch in response to the output signal of the second comparator.

* * * * *